J. HEADFORD.
Wax-Lanterns.
No. 129,280.
Patented July 16, 1872.
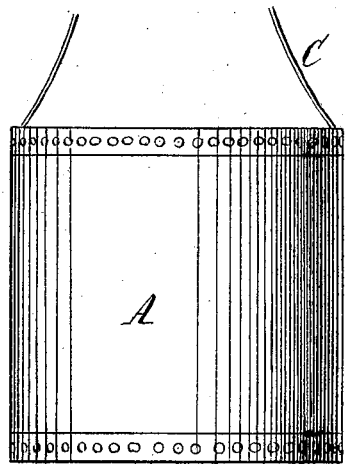
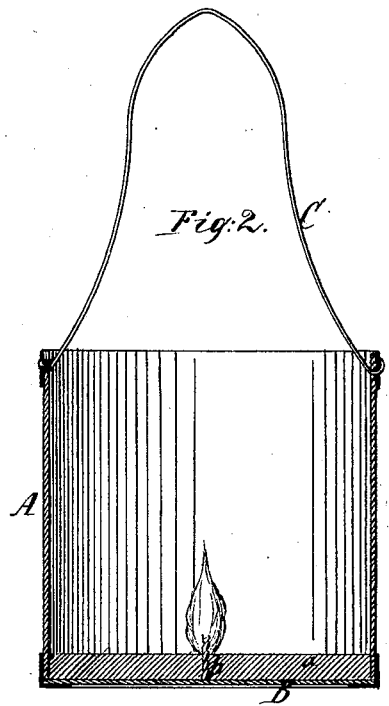
Witnesses.
C. Wahlers.
Ernst Bilhuber.
Inventor:
Joseph Headford 129,280

UNITED STATES PATENT OFFICE.

JOSEPH HEADFORD, OF NEW YORK, N. Y.

IMPROVEMENT IN WAX-LANTERNS.

Specification forming part of Letters Patent No. 129,280, dated July 16, 1872.

*To all whom it may concern:*

Be it known that I, JOSEPH HEADFORD, of the city, county, and State of New York, have invented a new and useful Improvement in Wax-Lanterns; and I do hereby declare the following to be a full, clear, and exact description thereof, which will enable those skilled in the art to make and use the same, reference being had to the accompanying drawing forming part of this specification, in which drawing—

Figure 1 represents a side view of this invention. Fig 2 is a vertical central section of the same.

Similar letters indicate corresponding parts.

This invention consists in the arrangement of a layer of wax, stearin, tallow, or other equivalent material on the bottom of a transparent or semi-transparent receiver, said bottom being provided with a wick which extends through the layer of wax or other equivalent material, in such a manner that when the wick is ignited, the flame is protected by the transparent or semi-transparent side of the receiver; the wax or other equivalent material is prevented from dripping down; and that an article is obtained which is very convenient for illuminating purposes, and particularly for the purpose of ornamenting Christmas-trees.

In the drawing, the letter A designates a receiver, which is made cylindrical or in any other suitable form or shape, its side or sides being composed of a sheet of gelatine or other transparent or semi-transparent material. I use gelatine by preference, since this material can be readily colored with any desired tint, it is flexible, easily secured, and produces a good effect. My receiver is open at the top, and on its bottom B is spread a layer, *a*, of wax, stearin, tallow, or fother material of a similar nature, and through this layer extends a wick, *b*, which rises from the bottom B. In the top edge of the receiver A is secured a bail, C, for the purpose of suspending the device from any place which may be selected for this purpose.

When the wick *b* is ignited, the flame is protected by the receiver, and at the same time it is rendered visible through the transparent or semi-transparent side of said receiver. Furthermore, the wax or other burning material is prevented from dripping down, and my wax-lantern can be used with great advantage for the purpose of ornamenting Christmas-trees, or for illuminating purposes in general.

What I claim as new, and desire to secure by Letters Patent, is—

The arrangement of a layer of wax, or other material of a similar nature, on the bottom of a receiver constructed of transparent or semi-transparent material, and provided with a wick extending through the layer of burning-material, substantially in the manner herein shown and described.

This specification signed by me this 11th day of June, 1872.

JOSEPH HEADFORD.

Witnesses:
 W. HAUFF,
 E. F. KASTENHUBER.